United States Patent Office 3,276,992
Patented Oct. 4, 1966

3,276,992
PROCESS FOR PRODUCING ANION PERMSELECTIVE MEMBRANES
Hiroshi Hani, 7391 Kugenuma, Fujisawa, Japan, and Akira Nishihara and Hisao Hiraga, both of 62 Kuritaya, Kanagawa-ku, Yokohama, Japan
No Drawing. Filed July 24, 1961, Ser. No. 125,960
9 Claims. (Cl. 204—296)

The present invention relates to a process for producing anion permselective membranes which have a length of more than 1 cm. in at least two dimensions and consist of an insoluble and infusible synthetic organic solid polymer, a reinforcing material supporting said solid polymer and anion-exchange groups chemically combined with said solid polymer and which are electrolytically conductive, anion selective and physically strong.

The present invention includes a process for producing anion permselective membranes set forth above, which are not subject to fracture or cracking in the course of their production.

Furthermore, the present invention includes a process for producing anion permselective membranes as described above, which is suitable for industrially producing anion permselective membranes referred to above on a mass production.

In regard to the anion permselective membranes having a length more than 0.25 inch in at least two dimensions and consisting of an insoluble and infusible synthetic organic solid polymer, these membranes are disclosed in Clarke U.S. Patent 2,800,445. The patent describes a process, wherein at least one polyvinyl aromatic compound and at least one monovinyl aromatic compound are dissolved in an inert organic solvent of a quantity corresponding to at least 20% of the total volume, in which said polyvinyl aromatic compound amounts to at least 20 mol percent of the total polymerizable ingredients, and the solution thus obtained is then cast to a membrane form and polymerized under such conditions that the escape of the solvent is substantially prevented so as to form a coherent uniform gel structure. During the polymerization the membrane is brought to an insoluble and infusible stage and then is haloalkylated, the resulting haloalkylated gel being treated with teritary amine under conditions which substantially retain the solvent.

According to that process, cross-linking is effected by the polymerization of polyvinyl aromatic compounds and the polymer becomes an insoluble and infusible membrane having a three dimensional network structure, and the characteristic feature of this patent resides in that said membrane is a solvated gel, which is useful on drying.

A polymer having a three dimensional network structure which is cross-linked by polymerization in the absence of solvent is generally subject to fracture due to swelling stress when dipped in solvent. This fact can be seen from the description in said Clarke patent.

Thus, in hitherto known anion permselective membranes polymerization and cross-linking are simultaneously effected at the time of making the membrane to be haloalkylated and aminated and the membrane having a three dimensional network structure has been formed by the said polymerization. However, in such a process it is required to polymerize in the presence of a solvent and under conditions preventing escape of said solvent, and further also in the case of ion-exchange groups being introduced therein, the haloalkylation and amination must be effected in the presence of said solvent.

Also, in the case of polymerization being effected without using the solvent, as, for example, in U.S. Patent 2,864,774, the membrane is fractured at the time of haloalkylation and amination unless some means for preventing its fracture, such as the polymerization being carried out in the presence of a large quantity of plasticizer in a hermetically closed receptacle, are taken.

The present invention provides a process entirely different from those processes, for producing anion permselective membranes which do not fracture in the course of haloalkylation, amination and drying. Further, the hitherto known processes are not suitable for mass production, since their polymerization is carried out in such a manner that the sheets are cast one by one between glass sheets. In the present invention, on the contrary, a continuous mass production is possible. Moreover, in the usual processes it was difficult in practice to produce products of a uniform and small thickness over a large area, whereas according to the present invention products having a small thickness can readily be obtained in any size on an industrial scale. Another characteristic feature of this invention resides in that products can be obtained which are excellent not only in mechanical strength, but also in electro-chemical properties.

Other important features of the present invention will be apparent from the following description.

Specifically, the present invention relates to a process for the production of anion permselective membranes, which are electrically conductive, selectively anion permeable and physically strong, which have a length of more than 1 cm. in at least two dimensions and which include an insoluble and infusible synthetic solid organic polymeric structure, a reinforcing material supporting the said structure and anion-exchange groups combined chemically with the said solid polymeric structure, comprising impregnating a latex of linear copolymer, which consists of a monovinyl aromatic hydrocarbon compound and a conjugated aliphatic polyene compound and contains 35 to 75% of bound monovinyl aromatic hydrocarbon compound based on the weight of the copolymer, to a reinforcing material, drying the reinforcing material impregnated with latex, forming a membrane of the said linear copolymer supported on the reinforcing material and thereafter treating the said membrane with a Friedel-Crafts reagent, for example, $AlCl_3$, $BF_3$, $AlBr_3$, $TiCl_4$, $TiBr_4$, $SnCl_4$ or the like as hereinafter set forth, to convert the said linear copolymer into an insoluble infusible three dimensional network structure and treating the thus obtained membrane composed of insoluble infusible copolymer and reinforcing material with a chloroalkyl ether followed by amination with amines.

In the present invention, as the reinforcing material for impregnating the said latex of linear copolymer, there can effectively be used organic or inorganic fibers or cloths which are not attacked by the treating agents used in the subsequent treatments of the invention. To this end, for instance, cloths made of glass fiber polyethylene terephthalate fiber, polyvinylidene chloride fiber, polyethylene fiber and polypropylene fiber are appropriate. These reinforcing materials are used to obtain products which retain accurately their dimensions in the course of the production of anion permselective membranes and have simultaneously excellent electro-chemical and mechanical properties. These cloths used in the present invention should have an apparent free space content of 45 to 70% for the purpose of obtaining favorable results. The apparent free space content of reinforcing material used in the present invention is defined as a volume expressed in percentage, which is obtained by subtracting the volume actually occupied by the fiber from the apparent volume of the cloth calculated by multiplying the thickness and surface area of the cloth. If the apparent free space content is outside the above-mentioned range, the resin tends to exfoliate from the cloth in the course of the treatments.

The monovinyl aromatic hydrocarbon compounds used in the present invention are for example styrene; $\alpha$-methyl styrene; o-, m-, or p-methyl styrene or vinyl naphthalene, and a typical example is styrene. Also, the conjugated aliphatic polyene compounds used in the present invention are for example butadiene-1,3; isoprene; 2,3-dimethyl butadiene-1,3 and the like. The most usually used one is butadiene-1,3. Furthermore, since latex of linear copolymer of styrene-butadiene is at present being produced industrially and is commercially available, this material is the most favorable raw material, and the product obtained by the use of this material shows the best properties.

When the said latex of linear copolymer is impregnated in the reinforcing material and dried to form a membrane the spaces of the said reinforcing material are completely filled with the linear coplymer, and a uniform structure is formed both in the interior and on the surface. The above-mentioned latex should have good film-forming properties. Therefore, it is very important that the latex of linear copolymer consisting of the monovinyl aromatic hydrocarbon compound and conjugated aliphatic polyene compound be used in the present invention and that the proportion of both ingredients in the linear copolymer be chosen as 35 to 70% of the former compound and accordingly, 65 to 30% of the latter compound. In other words, the film-forming property is satisfactory, when the bound monovinyl aromatic hydrocarbon compound of the above-mentioned latex is less than 70%. If this percent content exceeds 70%, the film-forming property disappears, but this content of the said bound monovinyl aromatic hydrocarbon compound can be increased up to 75% by the addition, as a plasticizer, of a latex of acrylonitrile-butadiene copolymer or latex of the same linear copolymer containing a smaller amount of monovinyl aromatic hydrocarbon compound. The content of the said monovinyl aromatic hydrocarbon compounds is extremely important not merely for the purpose of film formation as described before, but also for the subsequent treatment with the Friedel-Crafts reagent, the chloroalkylation and amination. On the other hand, unless the content of the monovinyl aromatic hydrocarbon compound is less than 75%, the membrane is fractured on drying after the treatment because the three dimensional structure being unable to be sufficiently developed even if the treatment with Friedel-Crafts reagent is applied, the swelling of the resin is high. At the same time, the content of the conjugated aliphatic polyene compound in the latex of the said copolymer is also important. In case the said compound is in excess of the predetermined amount, there is a tendency for the said copolymer to become exfoliated from the reinforcing material, when the membrane is treated with the Friedel-Crafts reagent, and simultaneously for the copolymer to become rigid and brittle by this treatment. A copolymer containing high butadiene is not desirable, since fewer anion-exchange groups can be introduced. According to the present invention it has been found that if the said linear copolymer containing 35 to 75% of the bound monovinyl aromatic hydrocarbon compound is not used, anion permselective membranes of good quality can not be obtained and the membranes are fractured or material peels off from the membrane in the course of the process.

Linear copolymers of styrene and butadiene are already known as synthetic rubbers, and these copolymers have high mechanical strength and good elongation. Other linear copolymers used in the present invention are substantially the same in the above respect. Accordingly, membranes in which such a linear copolymer is supported by a reinforcing material are not liable to be fractured during handling. Moreover, it has been found by the present inventors that the above-mentioned membranes prepared from latices which have a ratio of the two ingredients within the above-mentioned range also have remarkable properties hitherto unknown. Namely, with said membranes formed from these linear copolymers, a reaction occurs such that the membrane becomes an insoluble and infusible three dimensional network structure when treated with a Friedel-Crafts reagent. Thanks to the structure thus obtained the membrane does not fracture in the course of the subsequent chloroalkylation and amination.

U.S. Patent 2,645,621 to D'Alelio teaches a method for obtaining granular ion exchange resins, wherein a mixture of styrene and butadiene is copolymerized in an autoclave in the presence of a catalyst to produce bead cross-linked copolymers containing 75 to 98% of styrene and then the said copolymers are sulfonated. However, since the said granular ion-exchange resin has already finished cross-linking by butadiene when polymerized completely and is to be obtained as a three dimensional structure, the membrane making process of the present invention can not be carried out.

The latex used in the present invention is obtainable by subjecting a monomer to emulsion polymerization in aqueous medium in the presence of an emulsifier, a stabilizer, a catalyst, a pH-adjusting agent, a surface tension-adjusting agent and other well-known addition agents. However, since the use of the commercially available latices of linear copolymer of styrene and butadiene is most advantageous for the reasons referred to above, a commercially available latex may be used in the present invention.

The latices of said commercially available styrene-butadiene copolymers are copolymers which are not substantially cross-linked, and can be called linear copolymers and are soluble in solvents for rubber such as benzene and the like. The linear copolymers used in the present invention include also copolymers of monovinyl aromatic hydrocarbon compounds and conjugated aliphatic polyene compounds which are substantially not cross-linked.

The use of latex is advantageous particularly because anion permselective membranes are easily formed and simultaneously an excellent product can be obtained thereby. The present inventors have also tested processes wherein membranes are formed by rolling a massive polymer linear copolymer of the same monovinyl aromatic hydrocarbon compound and conjuated aliphatic polyene compound or by dissolving the same in a solvent and impregnating in a reinforcing material and by treating the membrane according to the same method as that of the present invention.

However, in this case, the formation of membranes was more difficult as compared with formation by the present invention and the reaction required a longer time, and the mechanical and electrochemical properties of the product were inferior to those obtained by the process according to the present invention.

The method of impregnating the latex into reinforcing material is not limited to the production of individual membranes. In the case of industrial mass production, the membranes can be made continuously by dipping a long sheet of reinforcing material as set forth above in the latex progressively from its one end to the other end, or if it is not required to perform it continuously, a required length of reinforcing material may be dipped in the latex sheet by sheet. Alternatively, a reinforcing material may be coated with the latex in place of dipping the reinforcing material in the latex.

A latex of approximately 60% solid content may easily be obtained, and moreover, even those high in solid content are very low in viscosity as compared with a relatively dilute solution of copolymer. Accordingly, the desired membrane can be obtained by immersing the reinforcing material in latex one to three times repeatedly and then drying whereby the spaces between the fibers of the reinforcing material are sufficiently filled with the latex. Furthermore, the latex can usually be used conveniently at a solids content of more than 30% and a viscosity of approximately 10 to 500 cp./25° C.

The proportion of the amount of reinforcing material to copolymer impregnated therein is an important feature. It has been found that when the volume ratio of the copolymer to the total volume of the dried membrane including reinforcing material in the dried condition prior to the treatment with Friedel-Crafts reagent is less than 40%, no hydraulically impermeable anion permselective membranes can be obtained and on the other hand, when such a volume ratio is more than 75%, anion exchange resin tends to peel off from the reinforcing material. Therefore, the linear copolymer supported by reinforcing material is required to be in the range from 40 to 75% of the total volume in a dried state. The copolymer content used in the present invention means a volume ratio of linear copolymer to the total volume of membrane. The drying after the latex is impregnated in the reinforcing material is a necessary step for the subsequent reactions. For the drying, air drying may be used, but a quicker drying may be obtained by heating at about 100° C. In the case of reinforcing material being immersed in latex, it is necessary to prevent crinkling and to keep uniform the adhesion of latex. For this purpose, various known methods may be used. In this connection, it has been found effective that the concentration of latex be generally adjusted so as to permit two dips and two dryings.

In this way, a dried membrane of linear copolymer of monovinyl aromatic hydrocarbon compound and conjugated aliphatic polyene compound, supported by reinforcing material can be obtained. The copolymer content of this membrane ranges from 40 to 75%; moreover, said copolymer contains 35 to 75% of monovinyl aromatic hydrocarbon compound and the reinforcing material used herein has an apparent free space ratio of 45 to 70%. As described before, this copolymer is a linear copolymer which is soluble and has a high elasticity and strength. Accordingly, this product is free from the danger of being fractured in the steps of drying and other treatments.

In the present invention, the linear copolymer of the membrane is caused by the Friedel-Crafts reagent to be changed to an insoluble and infusible three dimensional structure.

Natural rubber is cyclized to an insoluble three dimensional structure, if it is treated with the Friedel-Crafts reagent, but it has been reported in "Synthetic Rubber" edited by G. S. Whitby, p 613, John Wiley & Sons, Inc., New York (1954), that the linear copolymer of styrene and butadiene is hardly cyclized in such a treatment. However, it has been found by the present inventors' investigation that in the case of a membrane obtained by a process as in the present invention, the linear copolymer is readily converted into an insoluble three dimensional structure with the Friedel-Crafts reagent. As described above, as a Friedel-Crafts reagent to be used in said treatment, $AlCl_3$, $BF_3$ $AlBr_3$, $BCl_3$, $TiCl_4$, $TiBr_4$, $SnCl_4$ or the like is used per se or in the form of a solution. Of these compounds, liquid or gaseous material may be used as such or after being dissolved in a solvent. The solid material must be used in the form of a solution. Thus, when an equivalent amount of ethyl ether is added to $AlCl_3$, a soluble complex compound is obtained, and the $AlCl_3$ can be used after being dissolved in an organic solvent, such as dichloroethane, tetrachloroethane, trichloroethylene and the like. The solution of the Friedel-Crafts reagent as described above includes such a case and the treatment with Friedel-Crafts reagent includes also treatment with such a solution. The cases where the Friedel-Crafts reagents, $AlCl_3$ solution and $TiCl_4$ are used are most effective for getting good results.

Treating with these reagents may be carried out in many ways. Generally, the membrane comprising said reinforcing material and linear copolymer supported by the reinforcing material is dipped in for instance, said $AlCl_3$ solution or $TiCl_4$ and in the case of the reagent being in a gaseous state at the treating temperature as in the case of $BF_3$, the membrane to be treated may be left to stand in the gaseous atmosphere. In these cases, the temperature of treatment is not critical. Room temperature is suitable. The time for treatment should be chosen according to the thickness of membrane to be treated, the kind of copolymer, and the properties desired. The times described later in the example of this invention are appropriate for each respective case. Thus, the membranes treated with Friedel-Crafts reagent are thereafter washed in liquid hydrocarbon, chlorinated hydrocarbon or alcohol. The membranes comprising the copolymer thus cyclized to an insoluble three dimensional structure and the reinforcing material supporting the said copolymer are thoroughly freed from the washing agent by drying, or dipped in the same solvent as that for chloroalkylation. The three dimensional structure copolymer thus obtained is sufficiently resistant to drying, and moreover, when it is dipped in a solution of chloroalkylating agent directly after drying, no fracture occurs.

The membrane thus obtained is subsequently chloroalkylated. The chloroalkylation is carried out by dipping the membranes to be treated in a solution of chloroalkylating catalyst such as $ZnCl_2$, $FeCl_3$, or $SnCl_4$, in chloroalkyl ether. As a chloroalkyl ether, a well-known chloromethyl ether, dichloromethyl ether, and the like may be used. With regard to the chloroalkylating means, any known process can be used. Namely, chloroalkyl ether in a quantity of more than one mole per mole of aromatic nucleus of copolymer constituting said membrane may be used. The chloroalkyl ether solution of chloroalkylating catalyst may be used by diluting with a solvent such as tetrachloroethane, ethylene-dichloride or the like, and in this case, the concentration of the catalyst is preferably 1 to 20%. The chloroalkylation is preferably carried out at around room temperature. Chloroalkyl ether is liable to decompose above 50° C. It is, therefore, appropriate to work below 50° C. The time required for the treatment depends on the thickness of membrane to be treated, and the kind of Friedel-Crafts reagent and chloroalkylating agent. Typical examples are shown in the examples below. The membrane in which chloroalkylation has been finished is thoroughly rinsed with, for instance, tetrachloroethane, alcohol and water to remove chloroalkyl ether and catalyst. Thus, chloroalkyl groups are introduced into the aromatic nucleus of the copolymer constituting the membrane.

The membrane thus rinsed is treated with an aminating agent, as rinsed or after drying, whereby chloroalkyl groups are substituted by amino groups. For the amination, any of the known aminating agents can be used. Namely, when the membrane thus treated is aminated by a primary or secondary amine such as methylamine, dimethylamine or the like, an anion permselective membrane consisting of weakly basic anion-exchange resin can be obtained. When the amination is effected with a ternary amine such as trimethylamine or pyridine, an anion permselective membrane can be obtained, whose constituent material is a strongly basic anion-exchange resin. The amination referred to in the present specification covers all of them. For a method for treating with those aminating agents, any known process can appropriately be adopted. A process for dipping the membrane, which has been chloroalkylated and rinsed, in a solution of trimethylamine in water, alcohol, acetone or the like is one of the appropriate processes. In this case, the concentration of trimethylamine in the solution is not limited. However, 0.2 to 2 N solutions of trimethylamine are examples of suitable concentrations. The amination is usually effected at room temperature. The time for treatment may be selected as shown in the examples, taking into consideration other conditions. In this way, the membrane in which the amination is finished is rinsed with acetone or water to obtain the products.

Anion permselective membranes thus obtained according to the present invention show an extremely good anion-permselectivity. The transport number of chloride ion through the membrane is 0.91 to 0.96 (the method of measurement is described later). The effective resistance is as small as approximately 1.5 $\Omega$-cm.$^2$. In industrial practice, there is obtained an advantage that a long sheet of reinforcing material is dipped in latex from its one end and withdrawn and then is dried, and further consecutive treatments with Friedel-Crafts reagent, chloroalkylation and amination can continuously be carried out in order. The membranes are not fractured in the course of such process. Since such a process can be carried out, the length of the product can be as great as several tens of meters, if necessary. The width is not limited and a product over 1 meter in width can be obtained. Of course, smaller sizes can be made, for instance, approximately 10 cm. both in length and in width. In such a case, a batch process is preferable, as shown in the examples. The thickness of the products ranges from 0.08 to 3.0 mm. and especially around 0.2 mm. excellent results are obtainable. The mechanical strength of the membranes thus obtained is extremely high and a strength of 180 lbs./in.$^2$ can be obtained as measured by Müllen's bursting strength tester.

In order to enable those skilled in this art to practice the invention, the following illustrative examples are given.

The transport numbers referred to in the following examples are those of chloride ion through the membrane, calculated from the membrane potential at 25° C., between 0.5 N and 1.0 N sodium chloride solutions on opposite sides of said membrane, and the effective resistance is the resistance per square centimeter of the membrane measured in 0.5 N sodium chloride solution at 25° C. The bursting strength is measured by Müllen's bursting strength tester.

Example 1

In 500 cc. of styrenebutadiene copolymer latex having 66% of bonded or bound styrene and total solid of 48% was dipped a glass fiber cloth of 10 x 10 cm.$^2$ size; 0.07 mm. thickness; warp 60 threads/inch; weft 64 threads/inch and an apparent free space content 60% for 12 minutes, withdrawn, and thereafter hung from one end to be air-dried for 16 hours. The dried copolymer supported on the glass fiber cloth showed 58 volume percent of copolymer content. This membrane was cut to 10 x 10 cm.$^2$, and the cut membrane was dipped in 300 cc. of a solution composed of 134 parts by weight of anhydrous aluminum chloride, 74 parts by weight of diethylether and 208 parts by weight of dichloroethane, for 1 hour at 30° C. and then rinsed twice with 200 cc. methanol and air-dried. Thus, the styrene-butadiene copolymer of linear structure was converted to a three dimensional structure and a dried membrane of insoluble and infusible copolymer supported by glass fiber cloth was obtained. Thereafter, this membrane was dipped for 3 hours at 30° C. in 300 cc. of chloromethylating solution composed of 3 parts by weight of anhydrous tin tetrachloride, 15 parts by weight of chloromethylether and 82 parts by weight of tetrachloroethane, whereby chloromethyl groups were introduced into the benzene nucleus of said copolymer. The thus treated membrane was then rinsed twice with 300 cc. of methanol, then dipped in a 0.2 N methanol solution of trimethylamine, for 24 hours at 30° C. to effect amination, thereafter rinsed in running water and thus an anion permselective membrane was obtained. The membrane thus obtained had a size of 10 x 10 cm.$^2$; a thickness of 0.19 mm.; a transport number of 0.93; a bursting strength of 160 lbs./in.$^2$ and an effective resistance of 2.3 $\Omega$-cm.$^2$.

Example 2

In 500 cc. of the same latex as in Example 1 was dipped a polyethylene terephthalate fiber cloth of 10 x 20 cm.$^2$. The thickness of said cloth was 0.10 mm.; warp 75 threads/inch; weft 65 threads/inch; apparent free space content 50%. The copolymer content was increased to 51% by repeating twice the dipping and drying. The copolymer supported on the cloth was treated in the same manner as in Example 1 and thus an anion permselective membrane was obtained. The transport number was 0.92; the effective resistance 2.8 $\Omega$-cm.$^2$; the bursting strength 120 lbs./in.$^2$; and the thickness 0.17 mm.

Example 3

In 500 cc. of a latex of styrene-butadiene linear copolymer having 46% of bonded styrene, was dipped the same glass fiber cloth as in Example 1 and of the same size. It was withdrawn and dried by irradiation on both its sides with two 250 watt infra-red ray lamps, and this dipping and drying was repeated twice. The membrane thus obtained showed a copolymer content of 58%. Thereafter, it was dipped in the same mixed solution of anhydrous aluminum chloride, diethylether, and dichloroethane as in Example 1 for 1 hr. to effect cyclization. It was rinsed, dried, subsequently chloromethylated for 4 hrs. with the same chloromethylating solution as in Example 1, and thereafter aminated similarly. In the thus obtained membrane the transport number was 0.90 and the effective resistance 4.2 $\Omega$-cm.$^2$.

Example 4

In 500 cc. of the same latex as in Example 1 was dipped the same glass fiber cloth as in Example 1 and of the same size (10 x 20 cm.$^2$) and dried. The thus obtained membrane contained 45% by volume linear copolymer. One-half of this membrane was dipped in 300 cc. of TiCl$_4$ and held at 30° C. for 30 minutes to effect cyclization. The membrane thus changed to a copolymer of a three dimensional network structure was rinsed twice with 300 cc. of methanol and then dried and thereafter subjected to chloroalkylation and amination in a like manner as in Example 1. The transport number was 0.92, the effective resistance 1.8 $\Omega$-cm.$^2$ and the breaking strength 165 lbs./in.$^2$.

With the use of other latex of linear copolymer of monovinyl aromatic hydrocarbon and conjugated aliphatic polyene compound, substantially the same anion permselective membranes were also obtained.

What is claimed is:

1. A process for the production of anion permselective membranes which include an insoluble, infusible synthetic solid organic copolymer, a reinforcing material supporting the said copolymer, and anion-exchange groups combined chemically with the said solid copolymer, comprising impregnating a latex of linear copolymer of a monovinyl aromatic hydrocarbon and a conjugated aliphatic polyene compound into the reinforcing material, the bonded monovinyl aromatic hydrocarbon being 35 to 75% of the copolymer, drying the reinforcing material impregnated with latex thereby to form a membrane of linear copolymer supported by the reinforcing material, thereafter contacting the said membrane with the Friedel-Crafts reagent to convert the said linear copolymer into an insoluble, infusible three-dimensional network structure and contacting the thus-obtained membrane composed of insoluble, infusible copolymer and reinforcing material with a chloroalkyl ether followed by amination with amines.

2. An anion permselective membrane formed by the process of claim 1.

3. A process as claimed in claim 1, in which the concentration of the latex is more than 30%.

4. A process for the production of anion permselective membranes which include an insoluble, infusible synthetic solid organic copolymer, a reinforcing material supporting the said copolymer, and anion-exchange groups combined chemically with the said solid copolymer, comprising impregnating a latex of linear copolymer of styrene and butadiene into the reinforcing material, the bonded styrene being 35 to 75% of the copolymer, drying the reinforcing material impregnated with latex thereby to form a membrane of linear copolymer of styrene and butadiene supported by the reinforcing material, thereafter contacting the said membrane with the Friedel-Crafts reagent to convert the said linear copolymer into an insoluble, infusible three-dimensional network structure, and contacting the thus-obtained membrane composed of insoluble, infusible copolymer and reinforcing material with a chloroalkyl ether followed by amination with amines.

5. A process as claimed in claim 4, in which the concentration of the latex is more than 30%.

6. A process for the production of anion permselective membranes which include an insoluble, infusible synthetic solid organic copolymer, a reinforcing material supporting the said copolymer, and anion-exchange groups combined chemically with the said solid copolymer, comprising impregnating a latex of linear copolymer of a monovinyl aromatic hydrocarbon and a conjugated aliphatic polyene compound into a reinforcing material having 45 to 70% of apparent free space, the bonded monovinyl aromatic hydrocarbon being 35 to 75% of the copolymer, drying the reinforcing material impregnated with latex thereby to form a membrane of linear copolymer supported by the reinforcing material, thereafter contacting the said membrane with the Friedel-Crafts reagent to convert the said linear copolymer into an insoluble, infusible three-dimensional network structure, and contacting the thus-obtained membrane composed of insoluble, infusible copolymer and reinforcing material with a chloroalkyl ether followed by amination with amines.

7. A process as claimed in claim 6, in which the concentration of the latex is more than 30%.

8. A process for the production of anion permselective membranes which include an insoluble, infusible synthetic solid organic copolymer, a reinforcing material supporting the said copolymer, and anion-exchange groups combined chemically with the said solid copolymer, comprising impregnating a latex of linear copolymer of styrene and butadiene into a reinforcing material having 45 to 70% of apparent free space content, the bonded styrene being 35 to 75% of the copolymer, drying the reinforcing material impregnated with latex thereby to form a membrane of linear copolymer supported by the said material and containing 40 to 70% of the copolymer in the volume ratio on the total of the membrane, contacting the membrane with the Friedel-Crafts reagent to convert the said linear copolymer into an insoluble, infusible three-dimensional network structure, and contacting the thus-obtained membrane composed of insoluble, infusible copolymer and reinforcing material with a chloroalkyl ether followed by amination with amines.

9. A process as claimed in claim 8, in which the concentration of the latex is more than 30%.

References Cited by the Examiner

UNITED STATES PATENTS 2,962,454  11/1960  McRae _____ 260—2.2

FOREIGN PATENTS 793,212  4/1958  Great Britain.

JOHN H. MACK, *Primary Examiner.*

D. R. JORDAN, *Assistant Examiner.*